(12) United States Patent
Maunder

(10) Patent No.: US 6,708,377 B2
(45) Date of Patent: Mar. 23, 2004

(54) TUBE CLAMP

(75) Inventor: Roy Peter Maunder, Old Portsmouth (GB)

(73) Assignee: Bio Pure Technology Ltd, Havant (GB)

( * ) Notice: Subject to any disclaimer, the term of this patent is extended or adjusted under 35 U.S.C. 154(b) by 0 days.

(21) Appl. No.: 10/134,303

(22) Filed: Apr. 26, 2002

(65) Prior Publication Data

US 2002/0174524 A1 Nov. 28, 2002

(51) Int. Cl.$^7$ .......................... A44B 21/00; F16L 17/00; F16L 23/10
(52) U.S. Cl. .......................... 24/279; 24/280; 24/282; 24/285; 285/112; 285/197; 285/410; 411/41
(58) Field of Search .......................... 24/279, 280, 282, 24/285, 305, 495; 411/41; 285/112, 114, 410, 419, 197

(56) References Cited

U.S. PATENT DOCUMENTS

| | | | | |
|---|---|---|---|---|
| 2,776,153 A | * | 1/1957 | Smith | 285/410 |
| 4,896,902 A | * | 1/1990 | Weston | 285/112 |
| 5,653,481 A | * | 8/1997 | Alderman | 24/285 |
| 5,697,650 A | * | 12/1997 | Brown | 285/197 |
| 5,873,611 A | * | 2/1999 | Munley et al. | 285/410 |
| 6,030,006 A | * | 2/2000 | Lin | 24/279 |
| 6,056,332 A | * | 5/2000 | Foster | 285/410 |

OTHER PUBLICATIONS

BSI—British Standards Institution, BS 4825, Part 3, 1991.
"Stainless Steel Clamp Pipe Couplings for the Food Industry," International Standard, ISO 2852, 2d Ed., Jun. 15, 1993.

* cited by examiner

Primary Examiner—Victor Sakran
(74) Attorney, Agent, or Firm—Ware, Fressola, Van Der Sluys & Adolphson LLP

(57) ABSTRACT

A clamp has two injection moulded tangs 1, 2 hinges together by a pin 3 and held closed by a wing nut 4 and a screw 5 having a cross-head 6. The tangs each have a tapered groove 7 running around inside them. In use, this groove engages flanges F on tubes T with a seal S therebetween to hold the tubes in sealing relationship with each other. The one tang 2 has a clevis 10 defined by two lugs 11. Each has an overhung recess 12 into which the cross-head 6 of the screw clips. A crossbar 14 connects the lugs remote from their tang, whereby the screw is limited in its angular displacement about the recesses 12, as shown in FIG. 3. The crossbar also stabilises the lugs against relative displacement under load when the nut is tightened. The other tang 1 has a part conical formation 21 on lugs 22 defining a clevis 23 similar to clevis 10. The nut has a complementary conical recess 24. Engagement of the formation 21 in the recess 24 restrains the lugs from separating under load as the nut is tightened.

7 Claims, 2 Drawing Sheets

TUBE CLAMP

CROSS-REFERENCE TO RELATED APPLICATIONS

Priority is claimed from Provisional Application Ser. No. 60/287,541 filed Apr. 30, 2001.

TECHNICAL FIELD

The present invention relates to a tube clamp and in particular a clamp for use with flanged tubes for food and related industries.

BACKGROUND OF THE INVENTION

Flanges for food industry tubes are prescribed by BS 4825 Part 3 and equivalent ISO 2852 and various clamps are available connecting such flanged tubes. Generally these have been of stainless steel and expensive.

SUMMARY OF THE INVENTION

The object of the present invention is to provide an improved tube clamp and in particular a clamp of plastics material.

A clamp of the invention comprises a pair of generally semi-circular tangs, hinged together at one end and connectable together at the other end by means of a screw and nut, the tangs having an inwards facing tapered groove for drawing two flanged tubes into sealing engagement, the screw having a crossbar for engaging in a clevis in one of the tangs, the clevis having a cross piece distal of the tang for stabilising the clevis and limiting angular displacement of the screw.

Preferably, the other tang also has a clevis for receiving the screw, this clevis and the nut have complementary conical formations for restraining the clevis from spreading as the nut is tightened.

BRIEF DESCRIPTION OF THE DRAWINGS

To help understanding of the invention, a specific embodiment thereof will now be described by way of example and with reference to the accompanying drawings, in which.

BEST MODE FOR CARRYING OUT THE INVENTION

Figure 1:
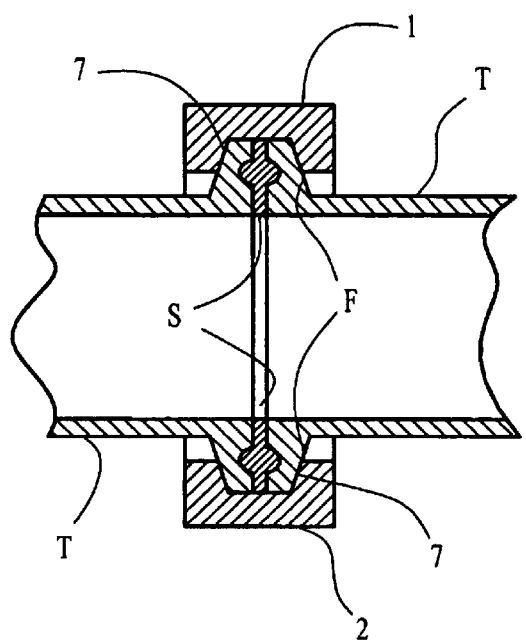
FIG. 1 is a cross-sectional front view of a clamp of the invention connecting to flanged tubes.
Figure 4:
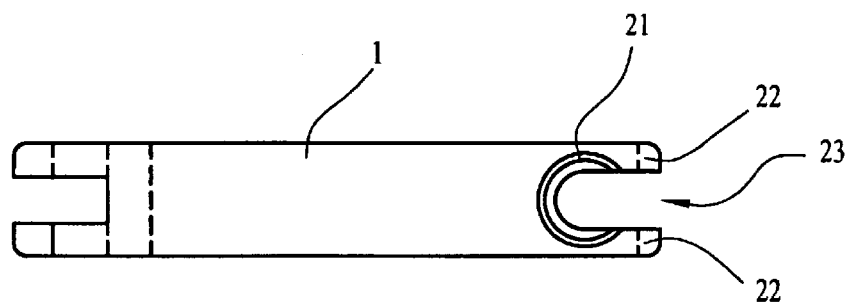
FIG. 4 is a plan view of one tang.
Figure 5:
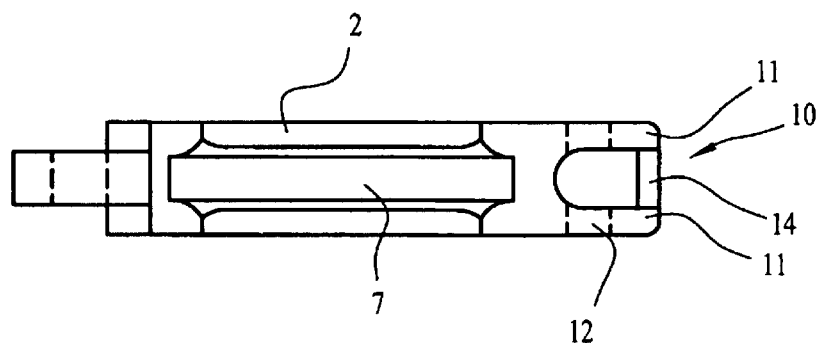
FIG. 5 is a plan view of another tang.
Figure 2:
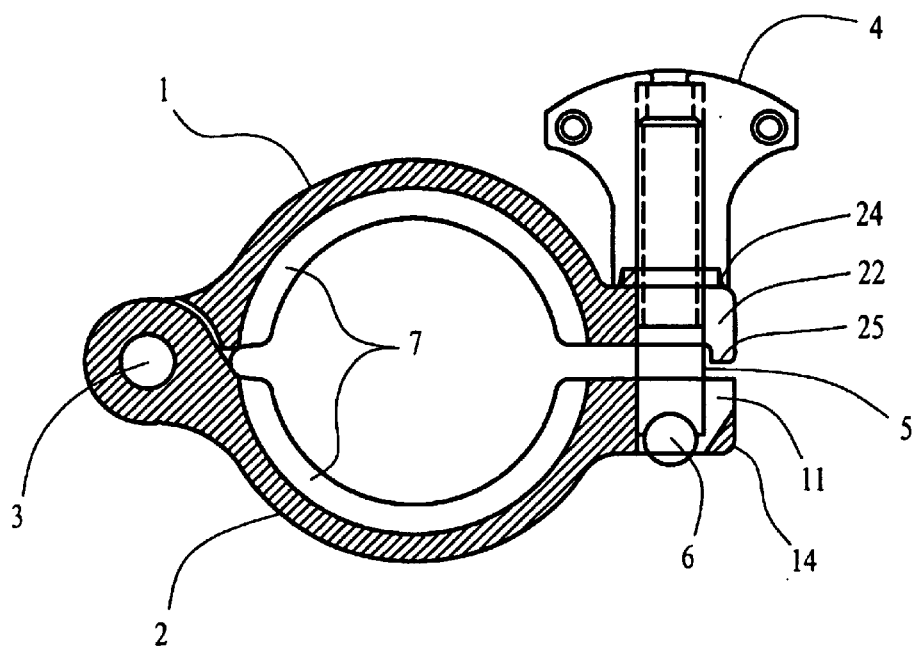
FIG. 2 is a cross-sectional end view of the clamp when closed, the tubes being omitted.

The clamp shown in the drawings has two injection moulded tangs 1, 2. They are hinged together by a pin 3 and held closed by a wing nut 4 and a screw 5 having a cross-head 6. The tangs each have a tapered groove 7 running around inside them. In use, this engages flanges F on tubes T with a seal S therebetween to hold the tubes in sealing relationship with each other.

Figure 3:
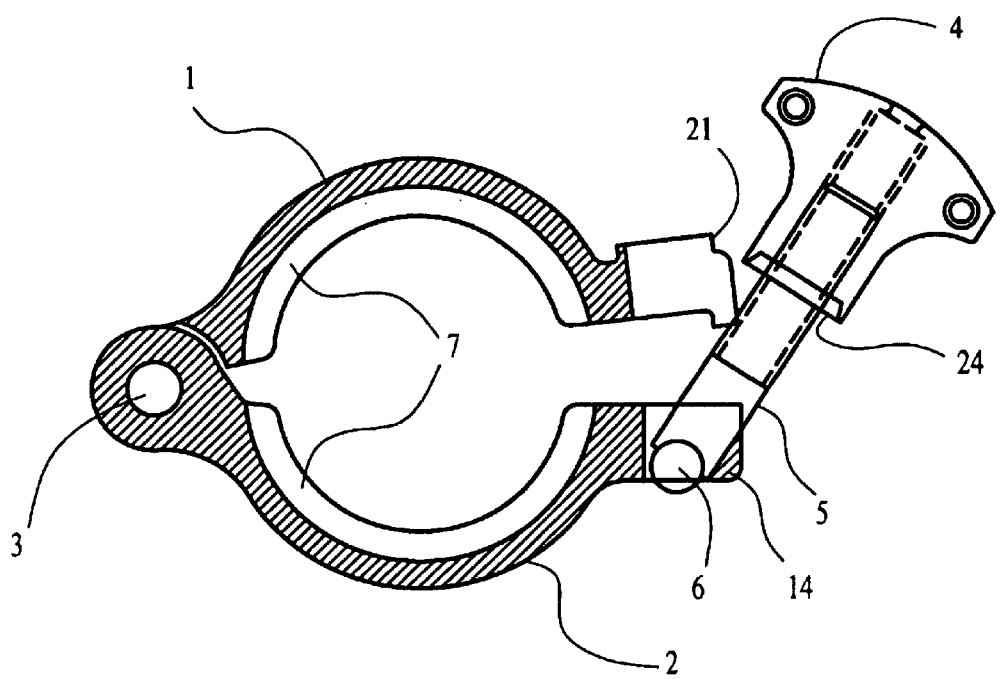
FIG. 3 is a similar view of the clamp when open.

The one tang 1 has a clevis 10 defined by two lugs 11. Each has an overhung recess 12 into which the cross-head 6 of the screw clips. A crossbar 14 connects the lugs remote from their tang, whereby the screw is limited in its angular displacement about the recesses 12, as shown in FIG. 3. The crossbar also stabilises the lugs against relative displacement under load when the nut is tightened.

The other tang 2 has a part conical formation 21 on lugs 22 defining a clevis 23 similar to clevis 10. The nut has a complementary conical recess 24. Engagement of the formation 21 in the recess 24 restrains the lugs from separating under load as the nut is tightened. As the nut is tightened mutual approach of the tangs is limited by projections 25 on the lugs 22 towards the lugs 11 to avoid over-tightening.

What is claimed is:

1. A clamp comprising a pair of generally semi-circular tangs, hinged together at one end and connectable together at the other end by means of a screw and nut, the tangs having an inwards facing tapered groove for drawing two flanged tubes into sealing engagement, the screw having a crossbar for engaging in a clevis in one of the tangs, the clevis having a cross piece distal of the tang for stabilising the clevis and limiting angular displacement of the screw.

2. A clamp as claimed in claim 1, wherein the clevis is defined by two lugs, each having an overhung recess into which the cross-head clips.

3. A clamp as claimed in claim 2, wherein the other tang also has a clevis for receiving the screw, this clevis and the nut having complementary conical formations for restraining the clevis from spreading as the nut is tightened.

4. A clamp as claimed in claim 3, including projections for limiting approach of the tangs and over-tightening of the clamp.

5. A clamp as claimed in claim 1, wherein the other tang also has a clevis for receiving the screw, this clevis and the nut having complementary conical formations for restraining the clevis from spreading as the nut is tightened.

6. A clamp as claimed in claim 2, including projections for limiting approach of the tangs and over-tightening of the clamp.

7. A clamp as claimed in claim 1, including projections for limiting approach of the tangs and over-tightening of the clamp.

* * * * *